UNITED STATES PATENT OFFICE.

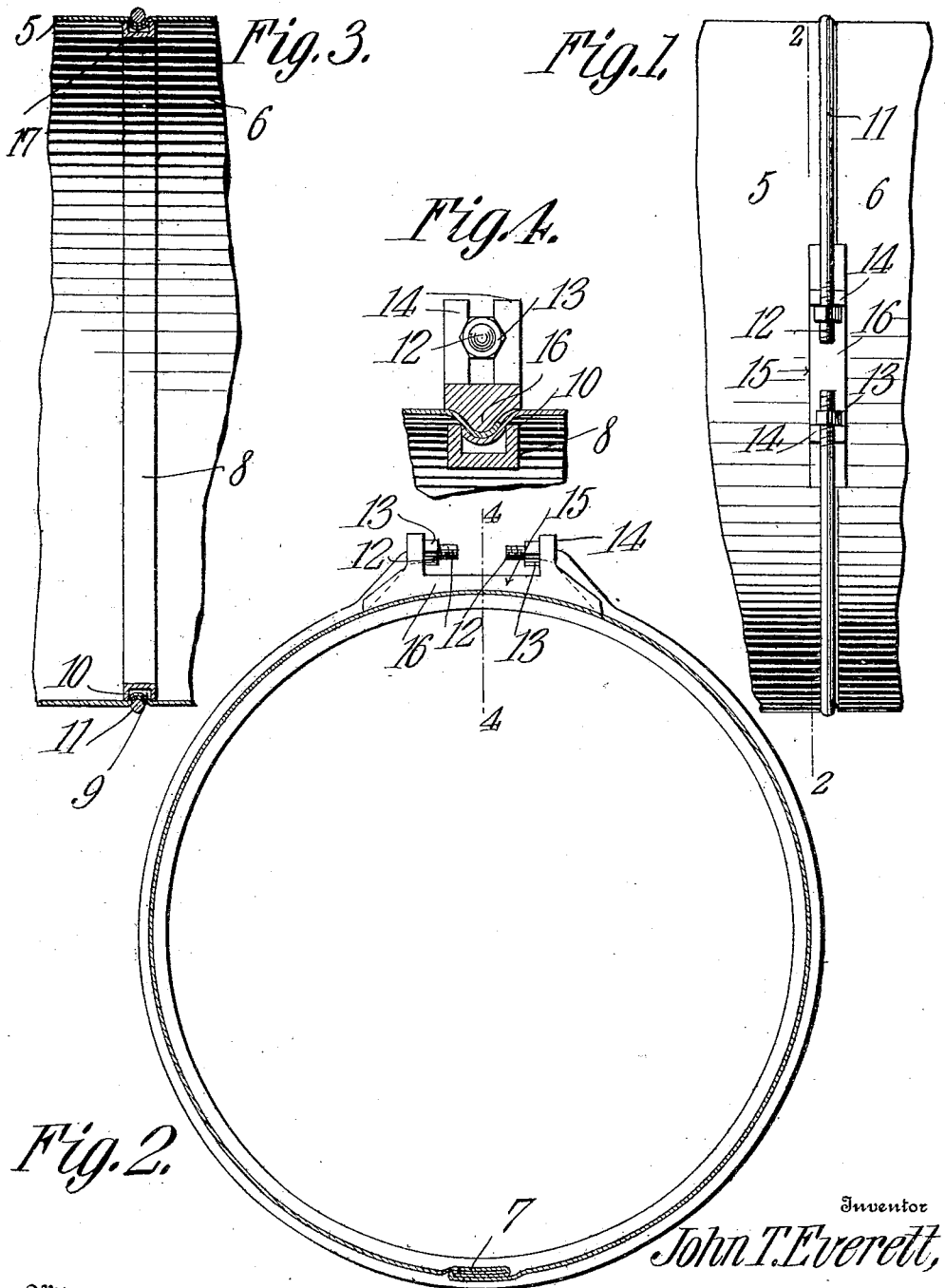

JOHN T. EVERETT, OF BASIN, WYOMING.

PIPE CLAMP OR COUPLING COLLAR.

No. 921,816.  Specification of Letters Patent.  Patented May 18, 1909.

Application filed July 23, 1907. Serial No. 385,127.

*To all whom it may concern:*

Be it known that I, JOHN T. EVERETT, a citizen of the United States, residing at Basin, in the county of Bighorn and State of Wyoming, have invented a new and useful Pipe Clamp or Coupling Collar, of which the following is a specification.

This invention relates to pipe couplings and has for its object to provide a comparatively simple and thoroughly efficient device of this character especially designed for uniting sections of pipes employed for conveying water in irrigating ditches and the like.

A further object of the invention is to provide a coupling including a channel ring adapted to engage the interior walls of adjacent pipe sections at the over-lapped ends thereof and having a clamping member or rod co-acting therewith and engaging the exterior walls of said pipe sections so that by adjusting the clamping member the over-lapped ends of the pipe sections will be forced within the seating groove of the channel ring and thus form a water tight joint between the several pipe sections.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claim.

In the accompanying drawings forming a part of this specification: Figure 1 is a side elevation of a clamp or coupling constructed in accordance with my invention showing the same in position on a pipe. Fig. 2 is a transverse sectional view taken on the line 2—2 of Fig. 1. Fig. 3 is a longitudinal sectional view. Fig. 4 is a transverse sectional view taken on the line 4—4 of Fig. 2.

Similar numerals of reference indicate corresponding parts in all of the figures of the drawings.

The improved coupling forming the subject matter of the present invention is principally designed for uniting two or more sections of pipe so as to produce a continuous culvert for conveying water in irrigating ditches and the like, and by way of illustration is shown applied to mating pipe sections one of which is indicated at 5 and the other at 6.

The pipe sections 5 and 6 are preferably cylindrical in contour and formed of galvanized iron or other suitable material, said sections having their inner ends over-lapped and their adjacent longitudinal edges provided with interengaging hooks constituting a lap joint 7.

Bearing against the interior walls of the pipe sections 5 and 6 and disposed at the over-lapped ends thereof is a reinforcing member 8 preferably in the form of a ring or annulus and having a circumferential seating groove 9 formed therein defining spaced annular flanges 10 adapted to bear against the adjacent walls of the pipe sections, as shown.

Surrounding the exterior walls of the pipe sections at the reinforcing ring 8 is a clamping member or rod 11 having its opposite ends threaded at 12 for engagement with suitable clamping nuts 13. The threaded ends of the rods pass between spaced ears or lugs 14 extending laterally from a clip or bracket 15, while the nuts 13 bear against the inner faces of the ears 14 so that by adjusting said nuts the rods 11 will force the over-lapped ends of the pipe sections in engagement with the seating groove 9 and thus form a water tight joint between the several pipe sections.

The clip or bracket 15 is provided with a longitudinally disposed rib 16 the lower end of which is curved or rounded and adapted to depress the over-lapped ends of the metal constituting the pipe sections within the seating groove or channel of the reinforcing ring when the nuts 13 are adjusted, as best shown in Fig. 4 of the drawings.

In using the device the pipe sections are arranged in horizontal alinement with the end of one section over-lapping the adjacent end of the mating section, after which the reinforcing rings 8 are positioned within the pipe sections and disposed at the over-lapped ends thereof. The clamping rod 11 is then positioned on the exterior walls of the pipe section and the nuts 13 adjusted on the threaded ends of the rod thus contracting said rod and causing the latter to force the over-lapped ends of the pipe sections within the seating groove of the reinforcing member, as best shown in Figs. 2 and 3 of the drawings.

Attention is here called to the fact that the ring 8 serves to reinforce and strengthen the pipe and brace the latter against external pressure. It will also be observed that the spaced annular flanges 10 of the reinforcing ring bite into the metal on each side of the lap joint 17 when the clamping rod 11 is adjusted so as to effectually prevent the escape of water at the juncture of said sections, the reinforcing ring forming in effect a housing for the over-lapped ends of the pipe sections.

From the foregoing description it will be seen that there is provided an extremely simple, inexpensive and efficient device admirably adapted for the attainment of the ends in view.

Having thus described the invention what is claimed is:

The combination with mating pipe sections having their inner ends over-lapped, of an annular reinforcing member disposed within the pipe sections at the over-lapped ends thereof and provided with spaced circumferential flanges of uniform cross sectional diameter and provided with flat peripheral contact faces, one of which bears against one of the interior walls of one of the pipe sections, the other contact being arranged to bear against the interior wall of the other pipe section, a bracket engaging the exterior walls of said pipe sections and provided with a central longitudinally bowed rib extending between the flanges of the reinforcing member and having oppositely disposed shoulders adapted to force the interior walls of the pipe sections into engagement with the flat contact faces of the flanges, said bracket being provided with oppositely disposed lugs having slots formed therein and opening through the tops of said lugs, a clamping rod surrounding the exterior walls of the pipe sections and provided with threaded terminals passing through the slots in the bracket, said clamping rod being disposed in alinement with the longitudinally bowed rib on the bracket and forming a continuation thereof, and nuts engaging the threaded terminals of the rod and bearing against the lugs for forcing the pipe sections between the flanges of the reinforcing member.

In testimony that I claim the foregoing as my own, I have hereto affixed my signature in the presence of two witnesses.

JOHN T. EVERETT.

Witnesses:
 WILLIS J. BOOTH,
 M. B. RHODES